US00H002111H1

(19) United States
(12) Statutory Invention Registration
Hurlburt et al.

(10) Reg. No.: US H2111 H
(43) Published: Nov. 2, 2004

(54) TEST AND EVALUATION COMMUNITY NETWORK (TECNET)

(75) Inventors: George F. Hurlburt, Bexington Park, MD (US); Harold C. Grossman, Clemson, SC (US); Alan Wayne Madison, Clemson, SC (US)

(73) Assignee: The United States of America as represented by the Secretary of the Air Force, Washington, DC (US)

(21) Appl. No.: 09/649,753

(22) Filed: Aug. 28, 2000

(51) Int. Cl.[7] ..... G06F 15/16

(52) U.S. Cl. ..... 709/217; 707/10

(58) Field of Search ..... 709/217; 707/4, 707/5, 9, 10; 370/260; 379/88.18; 382/190; 715/513

(56) References Cited

U.S. PATENT DOCUMENTS

| | | | | | |
|---|---|---|---|---|---|
| 5,689,550 | A | * | 11/1997 | Garson et al. | 379/88.18 |
| 5,991,276 | A | * | 11/1999 | Yamamoto | 370/260 |
| 6,272,244 | B1 | * | 8/2001 | Takahashi et al. | 382/190 |
| 6,484,173 | B1 | * | 11/2002 | O'Hare et al. | 707/9 |
| 6,484,176 | B1 | * | 11/2002 | Sealand et al. | 707/10 |
| 6,490,579 | B1 | * | 12/2002 | Gao et al. | 707/4 |
| 6,610,105 | B1 | * | 8/2003 | Martin, Jr. et al. | 715/513 |
| 2001/0047355 | A1 | * | 11/2001 | Anwar | 707/5 |

OTHER PUBLICATIONS

CBD News Robot, A—Engineering research and development support for test and evaluation community network (TECNET), Aug. 12, 1996.*

* cited by examiner

*Primary Examiner*—Daniel T. Pihulic
(74) *Attorney, Agent, or Firm*—William G. Auton

(57) ABSTRACT

Test and Evaluation Community Network (TECNET) is a set of software and safeguards that operates on a standard UNIX based computer to provide the following capabilities in a secure fashion via the World Wide Web operating over the Internet: Simple Mail Transfer Protocol (SMTP), Multimedia Internet Mail Extension (MIME) compliant electronic mail with many user features. Reflector configured bulletin board capabilities as a logical extension of the above electronic mail system for group sharing. Hierarchical file repositories allowing binary upload, copying, and download for Internet store and forward capability. Protected File Transfer Protocol (FTP) areas supplant the above file repository capability.

1 Claim, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TEST AND EVALUATION COMMUNITY NETWORK (TECNET)

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to Internet test and evaluation systems, and more specifically to a web host enabling tool for collaborative knowledge sharing within the test and evaluation community.

The best patented Internet test support systems are described in the following patents, which are incorporated by reference:

U.S. Pat. No. 5,796,953, Aug. 18, 1998, System having user terminal connecting to a remote test system via the internet for remotely testing communication network, Zey, David A., and U.S. Pat. No. 5,203,201, Apr. 20, 1993, On-line web filtration efficiency test method, Gogins, Mark A.

The Test and evaluation Community Network (TECNET) has led the way in technical communication initiatives on behalf of the Defense Test and Evaluation community since its creation in 1984. TECNET's role has always been to assist in the meaningful and timely information exchange among geographically, organizationally and functionally disparate test and evaluation practitioners. TECNET has accomplished this mission despite numerous organizational, oversight and technology changes since its inception. It has done so, not by standing still, but not by running too fast either. Rather TECNET has established capabilities before the real need arises, but not so soon that the risk is unacceptable. As a result, TECNET has provided cost effective capabilities for its constituents when dictated by emergent practical market drivers. Such was the case with the advent of electronic mail, public web offerings of general value to Test and Evaluation engineers world wide, private web enabled information exchange for groups such as the Range Commander's Council and many others, and applied behind-the-scenes internetsecurity practices. In 1999, TECWEB initiated a process based knowledge system approach to achieve an affordable interactive web capability. This paper takes a hard look at where TECNET now stands relative to traditional data handling approaches. It then describes the dynamics of new Internet oriented process based knowledge systems concept. It evaluates the advantages over the more accepted, but less suitable and more costly data based technologies. The bulk of this paper reports on specific progress to date. Finally, it outlines practical future directions for ongoing TECNET research and development in Fiscal year 2000. Most importantly, it establishes TECNET as a unique Government developed software offering, backed by inter-linked policies and procedures, to permit a successful transition to a highly competitive business to business Application Service Provider (ASP) capability in the commercial sector.

In 1984, the Office of the Secretary of Defense (OSD) initiated the Test and Evaluation Community Network (TECNET). The concept underlying TECNET held that Test and Evaluation (T&E) headquarters and field activities had a genuine need to exchange information. As best exemplified by the various pursuits of the Range Commander's Council (RCC), this information regularly crosses disciplinary, organizational, functional and process lines. OSD envisioned that TECNET should provide an electronic means to facilitate such necessary sharing between T&E practitioners. TECNET has successfully fulfilled this vision for over fifteen years. Over this period, however, the requirements and enabling technology for TECNET have significantly matured. In the broader context, TECNET, in particular its interactive World Wide Web component, TECWEB, offers a competitive approach to an integrated World Wide Web based business to business Application Service Provider (ASP). This ASP offering is based on uniquely designed TECNET software operating on the Unix operating system and the rigorous management policies and procedures that have evolved to manage this software under sound systems engineering principles. The attached document defines these policies and practices in the context of the system's design.

TECNET began as an OSD technology research initiative under direct contract to the Computer Sciences Department of Clemson University. In 1987, OSD agreed to continue to underwrite TECNET Research and Development (R&D) so long as the services would absorb the costs of TECNET Operations and Maintenance (O&M). To this end, OSD chartered a tri-service TECNET Steering Committee in 1988. In 1989, with the advent of the Multi-Service Test Resources Investment Committee (MSTRIC), the TECNET Steering Committee was shifted to serve under the former Joint Commanders Group for Test and Evaluation (JCGT&E). In that same year, TECNET operations were moved from Clemson University to the former Naval Air Test Center at Patuxent River, Md. The TECNET machine consumed an entire room.

In the following years, electronic mail became an emergent reality throughout the Department of Defense. As a leader in this fledgling field, the then character based TECNET supported tri-service T&E electronic mail until 1994. During these years, TECNET flourished. In 1994, the Department of Defense (DoD) electronic mail infrastructure began to come together. Some held that TECNET had outlived its purpose.

By 1994, however, the Joint Program Office for Test and Evaluation (JPO(T&E)) was commissioned. This organization was charged with management of the T&E investment processes. TECNET already supported the MSTRIC, which had become the T&E Reliance infrastructure by that time. TECNET was also closely associated with the JPO (T&E) through T&E Corporate Information Management (CIM) initiative. TECNET's focus began to naturally shift towards greater support of the T&E investment process.

In 1995, TECNET shifted its technical emphasis from a rather outmoded character based system to a World Wide Web (WWW) presence. Initially TECNET focused on moving public information to a public TECNET home page as a move to clean up the character-based system. Later, TECNET created a private web offering to support groups and programs with a privately based web capability. Since late 1996, TECNET has been growing an interactive web presence, known as TECWEB. While every bit as vital a technology thrust as the electronic mail revolution in the early 1990's, the true notion of Web based collaboration is still in its infancy from a T&E corporate standpoint. TECWEB capability already outstrips the initial interactive private Web offerings of most corporations and T&E field activities. In recent months, growing TECWEB usage rates testify to the utility of a Web based exchange medium to convey knowledge among T&E and training operatives who share a common contextual understanding. In keeping with technology downsizing, the main TECNET machine is now only slightly larger than a Personal Computer (PC).

In 1997, the TECNET Steering Committee was dissolved and its responsibilities were transferred to the Test and Evaluation Reliance Investment Board (TERIB). TECNET management was absorbed by the JPO (T&E). By 1998, TECNET had both reduced its operating costs and garnered enough support from other DoD funding sponsors to significantly reduce its O&M bill to the services. This was ratified through the Board of Operating Directors (BoOD) in late 1997.

Throughout the program's life, TECNET OSD R&D support has continued unabated under a Program Element (PE) that has typically not been associated with the Central Test and Evaluation Investment Program (CTEIP) PE. Through multiple competitive contracts, the Computer Sciences Department of Clemson University has retained-the TECNET R&D role. This long-term continuity has allowed great economy for continued TECNET/TECWEB development by minimizing the learning curve.

SUMMARY OF THE INVENTION

The invention is a set of software and safeguards that operates on a standard UNIX based computer to provide the following capabilities in a secure fashion via the World Wide Web operating over the Internet:

A. Simple Mail Transfer Protocol (SMTP), Multimedia Internet Mail Extension (MIME) compliant electronic mail with many user features.

B. Reflector configured bulletin board capabilities as a logical extension of the above electronic mail system for group sharing.

C. Hierarchical file repositories allowing binary upload, copying, and download for Internet store and forward capability.

D. Protected File Transfer Protocol (FTP) areas to supplant the above file repository capability.

E. Threaded discussion areas for different-time, different place collaboration capabilities.

F. Optional voting tools associated with the threaded discussion areas.

G. Full-fledged formal voting tool including proxy voter capability.

H. Simple calendar tool to permit announcing future events.

I. Rudimentary database capabilities allowing user defined fields and record layouts.

J. Ability to automatically invoke, complete, and submit a pre-designed form to populate any of the above resources.

K. Integration of a Commercial Off The Shelf natural language search engine and its associated web crawling spider.

L. Automated WWW based administrative tools to permit:
1. Full user administration, definition and configuration of all the resources described above,
2. Assignment of user or group privileges, and
3. Ability to build and support custom applications using the above modular tools.

M. Reconfigureable business or system engineering process modeling drawing on the above capabilities to permit dynamic model execution by designated role players.

N. A comprehensive set of Internet security practices to allow management of all the above resources with greatly reduced risk.

O. A number of standard network interfaces allowing:
1. Direct and secure World Wide Web access,
2. Capability to serve as an Internet Service Provider (ISP),
3. Capability to support Post Office Protocol #3 (POP-3),
4. Ability to support standard Internet access modes such as File Transfer Protocol (FTP) and TELNET connections.

The TECNET operating environment also houses partitions to allow incremental release. In addition to newly released major code or applications, this environment also permits integration testing of TECNET modules as they are reassembled for specific user requirements. Each partition in the operating environment is separate and distinct from the other environments. These environments also exist separately for both the character based and World Wide Web based versions of TECNET. The WWW component of TECNET includes both public and private servers. Both WWW implementations support fully partitioned environments. Operating systems and certain universal utilities, such as send mail, compose the only underlying infrastructure. The environmental partitioning includes:

1) TECNET Team Workstation: This network accessible environment is where TECNET team members develop simple Hypertext Markup Language (HTML) code, HTML links or other simple system "look and feel" changes.

2) Alpha: This is the point of entry for all new code into the TECNET system. Here, new code, updates to TECNET modules, new modules and new TECNET Team written HTML is reviewed by the TECNET team prior to authorization to release to Beta. This area serves as a final check prior to review by real TECNET users.

3) Beta: This is the area where trusted and engaged TECNET users are asked to review and comment on new releases of TECNET capability. The ability to grant user privilege allows separation of users based on data "ownership" or need to know principles. Thus, beta testing not only tests functionality, but also the extent and appropriateness of privilege. Certain privileged users are also allowed to introduce their own custom pages using the TECNET Group Publisher tool. These materials should be reviewed in beta before the designated Group Publisher user elects to roll them to production.

4) Production: This is the area where the majority of the TECNET users have the ability to use all available TECNET Capabilities.

DETAILED DESCRIPTION OF THE PREFERRED EMBODIMENT

TECWEB houses a number of applications for the T&E community. Two recently fielded applications reflect the utility of TECWEB's modular design philosophy. TECWEB recently fielded the Test Investment Database (TIDWEB) for the T&E Reliance community. This highly interactive tool permits online formulation or submission of investment needs and solutions from the field. After service level review, these needs and solutions can then be officially distributed to Tri-Service Reliance panels for online evaluation and voting. Using other online tools and techniques, Reliance officials may fold Evaluated solutions into Test Capability Master Plans (TCMPs) and an overarching Test Requirements Master Plan (TRMP). The Facilities and Capabilities Information for Test and Training (FACITT) complements this database by providing a natural language search capability against all known facilities and capabilities information concerning Test and Training, including focused World Wide Web (WWW) resources. These two applications illustrate how TECWEB's collaborative modules can be folded together under a common access control mechanism to provide useful amalgamated functions.

Figure 1:
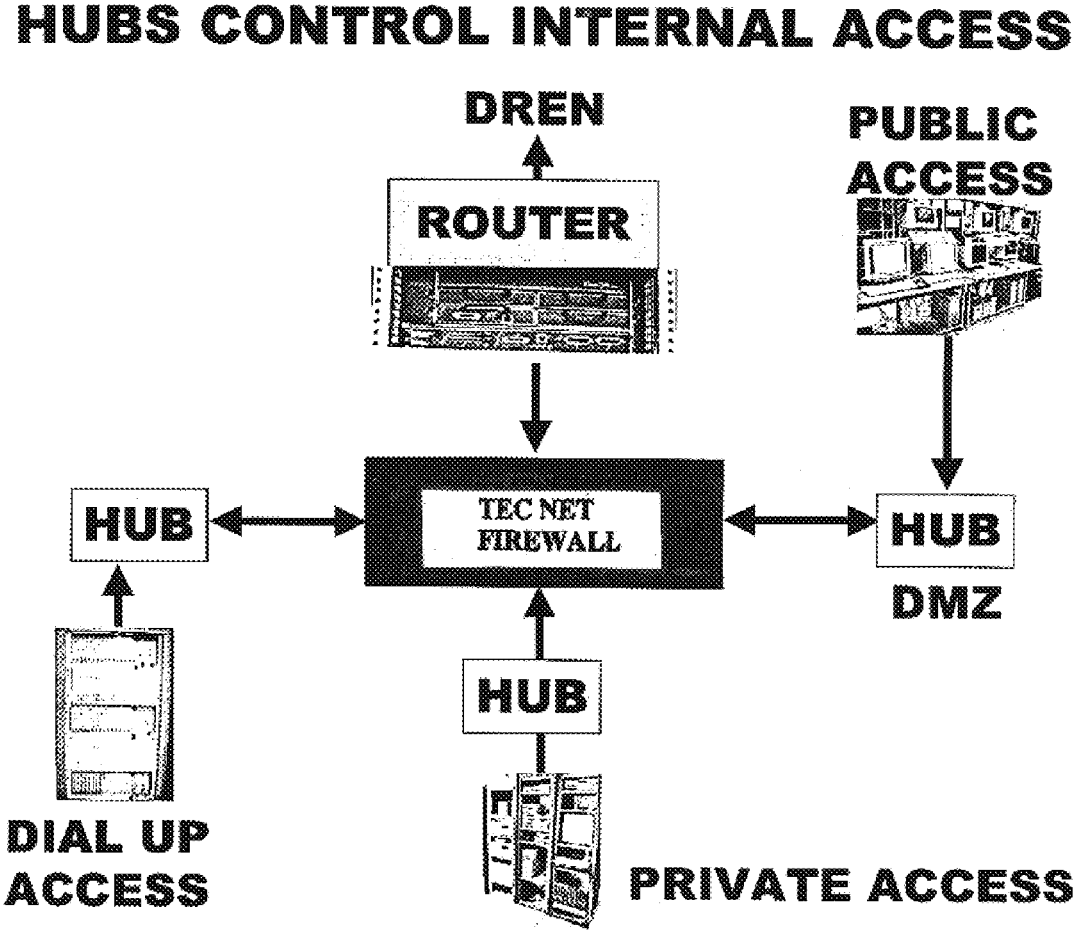
FIG. 1 is a block diagram of the hub control internal access elements of the present invention.
Figure 2:
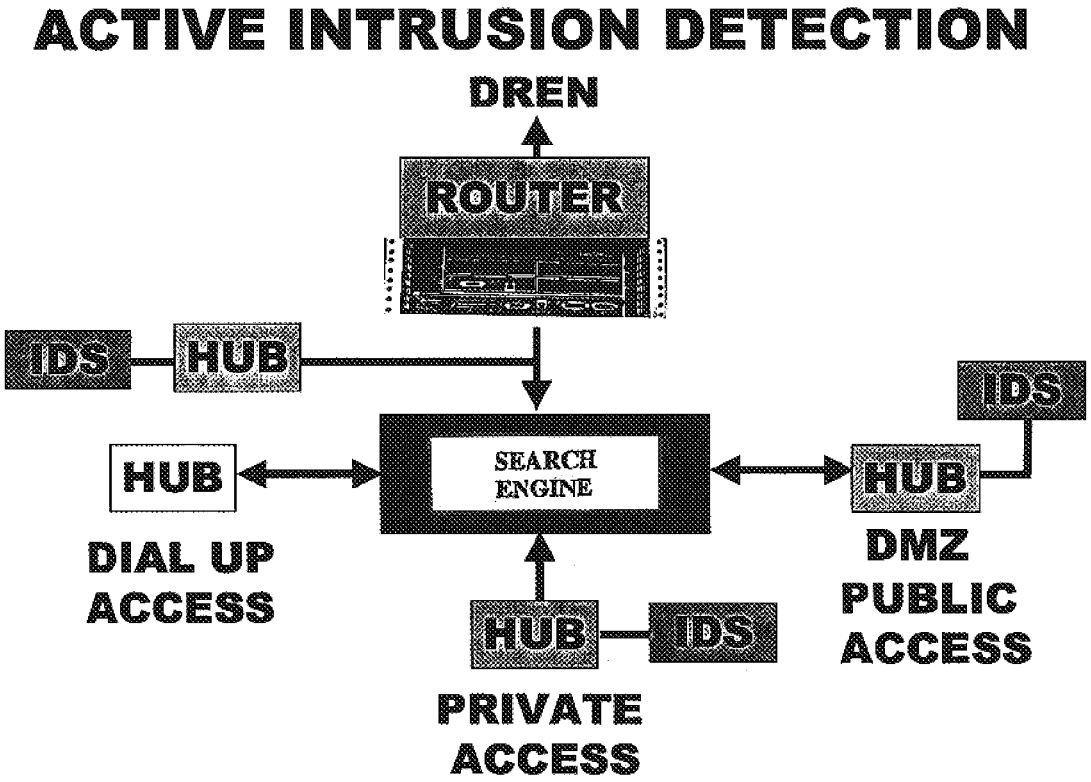
FIG. 2 is a block diagram of the active intrusion detection elements of the present invention.
Figure 3:
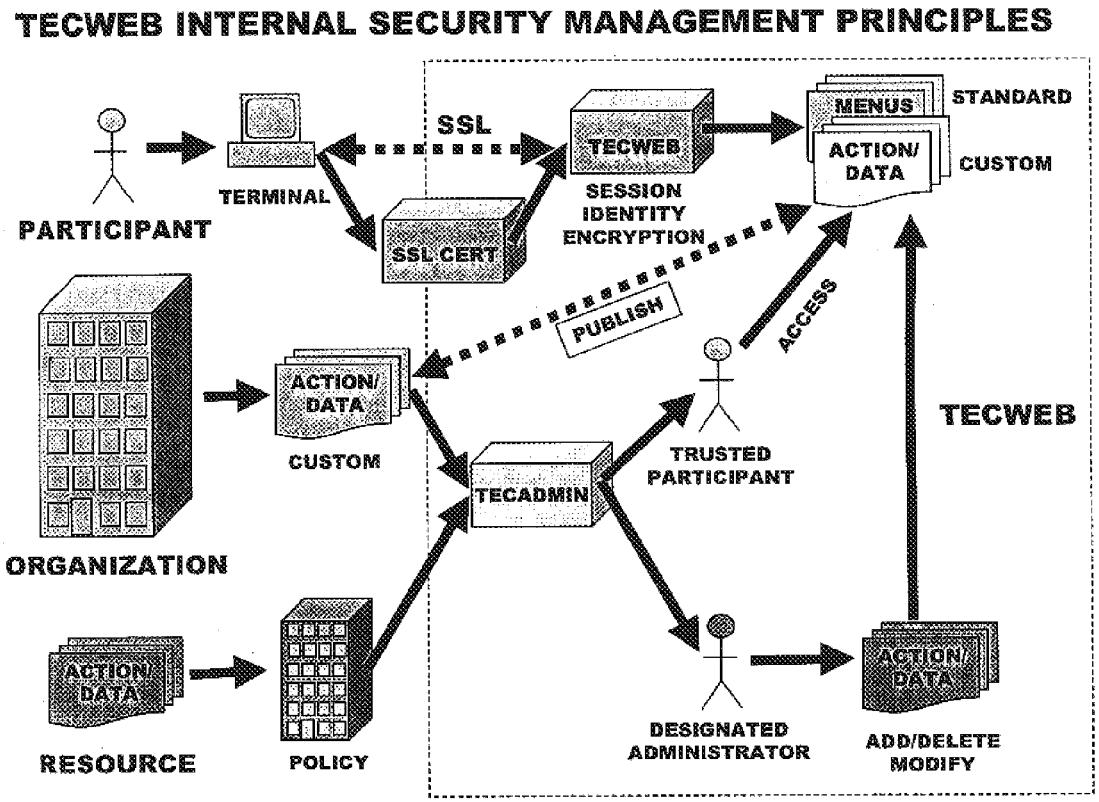
FIG. 3 is a block diagram of the TECWEB security management principles of the present invention.
Figure 4:
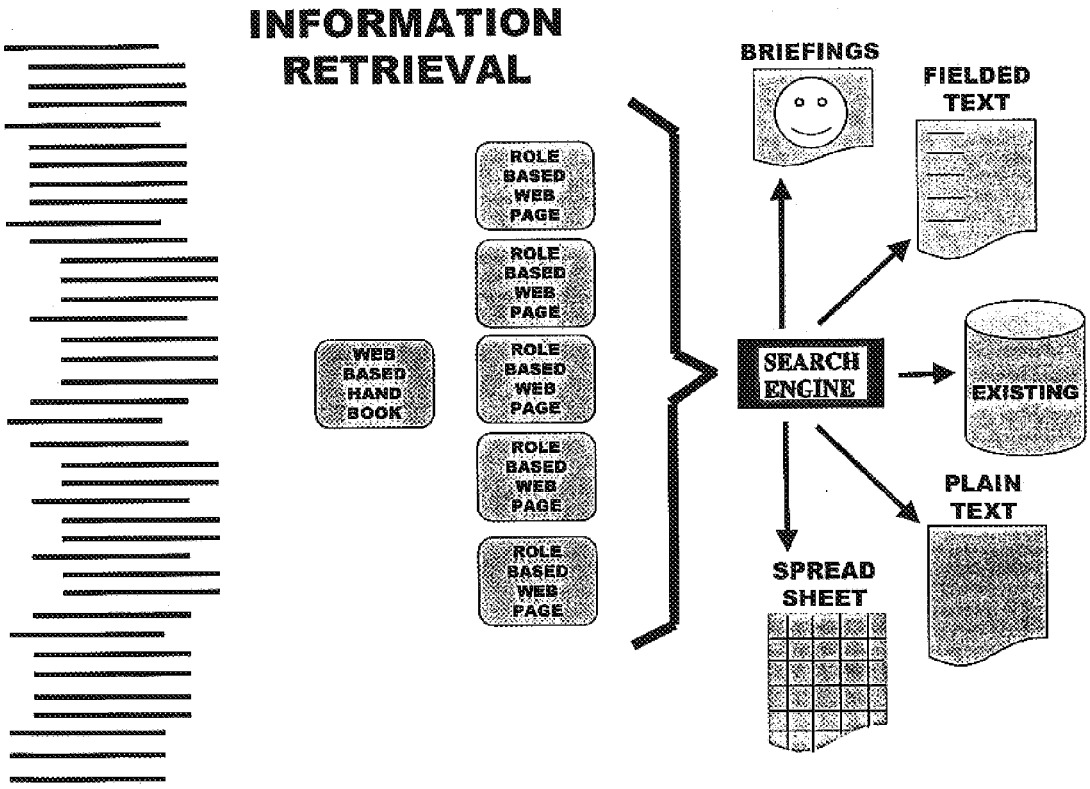
FIG. 4 is a block diagram of the text search engine use.
Figure 5:
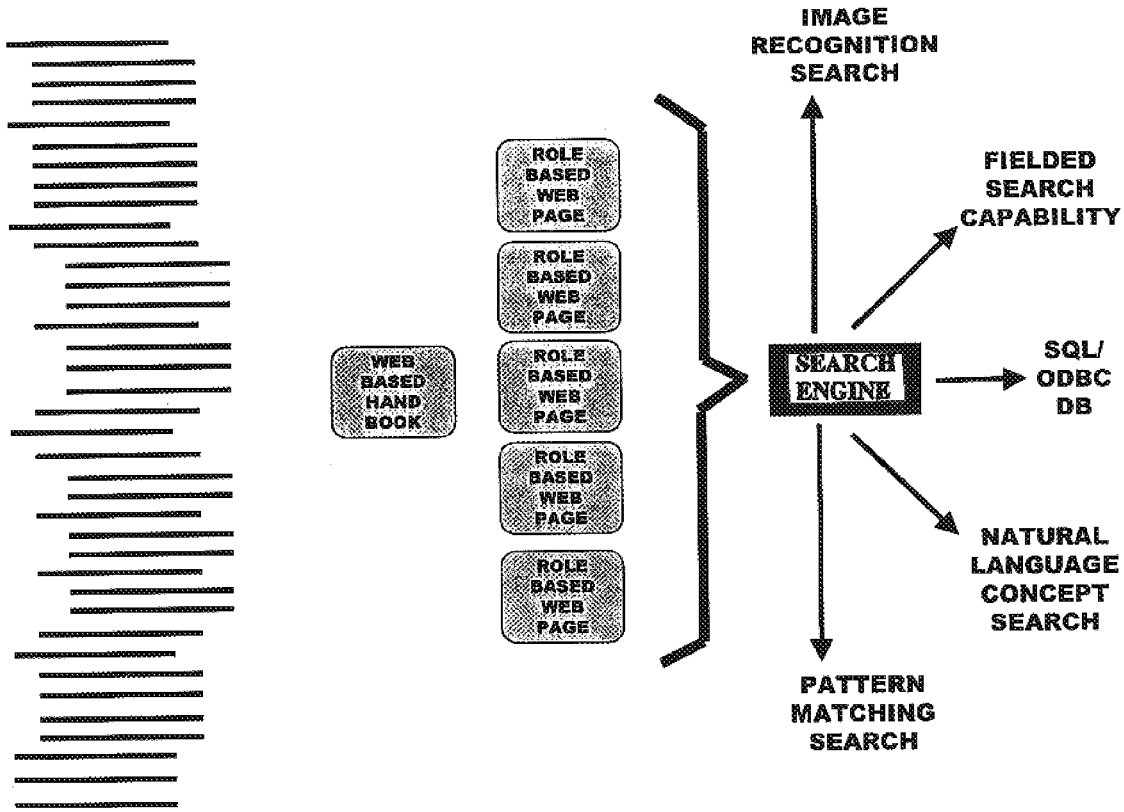
FIG. 5 is a block diagram of the scanned image search engine use.
Figure 6:
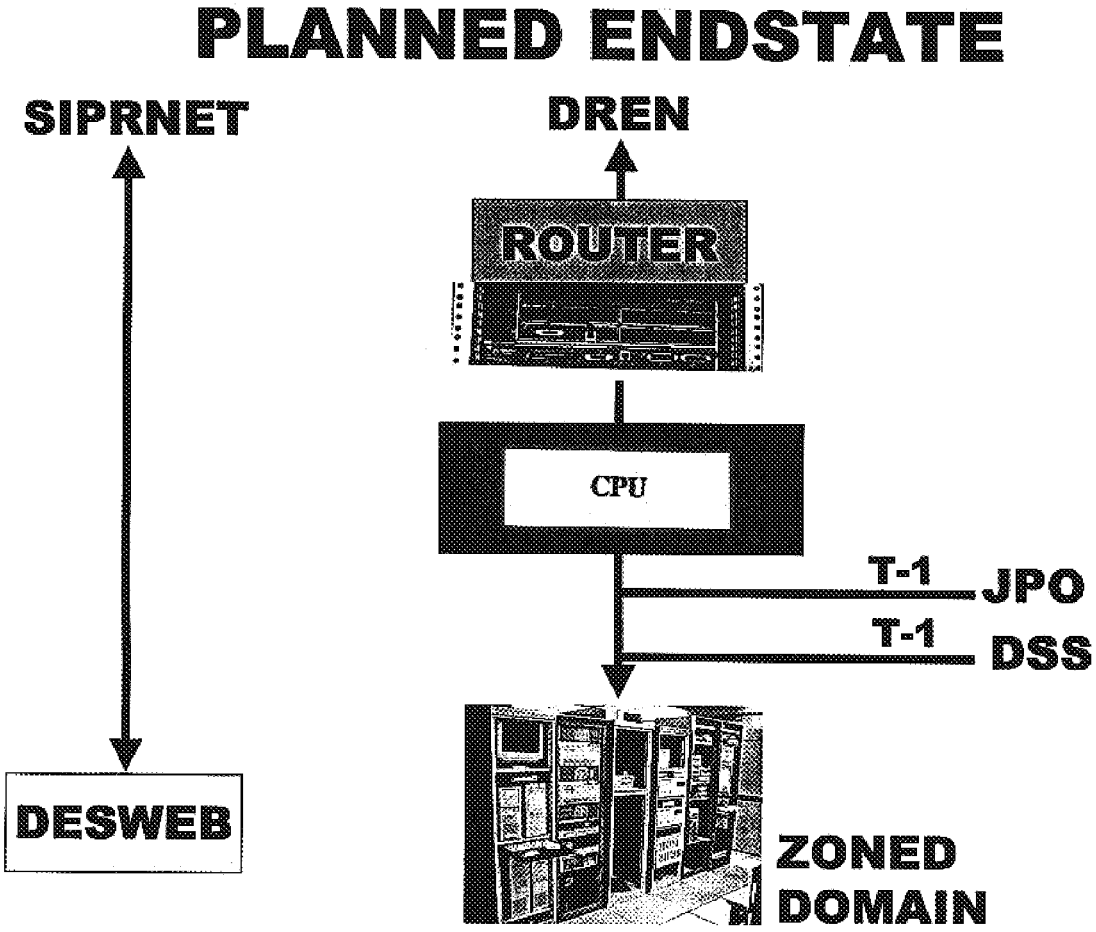
FIG. 6 is a diagram of the planned endstate.

The TECWEB modules have evolved from successful and time tested TECNET components. All TECWEB modules are built using an established alpha test, beta test and production cycle in a spiral development environment. The major TECWEB modules include:

As shown in FIG. 1, TECWEB contains a complete functional electronic mail System. Fully designed for an interactive World Wide Web (WWW) environment. This mail system is fully compatible with the Simple Mail Transfer Protocol (SMTP). This mail system supports Multipurpose Internet Mail Extension (IME) formats for management of a wide array of binary mail attachments. The mail system also supports internal return receipts, a full mail searching capability with many options, distribution lists creation and reuse, alternative facsimile transmission, bulletin board and reflector site posting, and custom mailbox creation and manipulation as determined by the user. All users automatically receive an "in", "out", "purged" and "old" box. The TECWEB mail system also works in full conjunction with the Post Office Protocol #3 (POP-3) capabilities housed in most browsers. This system may be harnessed as a function of other modules requiring automatic mail forwarding. TECNET mail operates under the latest release of the UNIX Sendmail utilities.

The TECWEB WWW based bulletin board system, similar to the TECWEB mail system, is SMTP and MIME compliant. TECWEB bulletin boards permit a shared environment for common messages. The bulletin boards may be configured in a number of ways. One key configuration permits creation of a "Reflector" site. In this bulletin board mode, remote users may post to the site, which both retains the postings as bulletin board messages and automatically forwards them to designated internal or remote users. Used multiply, these capabilities can permit an easily managed information exchange via otherwise public means with private deliberations available prior to public release of "findings". TECNET also supports MajorDomo driven listserver capabilities.

While physically separated from TECWEB for security reasons, the public TECNET Home Page (Or any other Home Page) can be directly accessible from within a TECWEB session. In this fashion, public and private (Sensitive but Unclassified) information may be intermingled for useful processing. Public TEWWB bulletin boards may be ported to the public pages if so desired. FACITT relies on this modular capability.

TECWEB supports a WWW based File Repository capability that permits direct browser upload and download of binary files. This structure may be organized in hierarchical fashion for ease of navigation. It may also be linked to a File Transfer Protocol (FTP) directory for batch upload and download by designated administrators. This tool set has proven useful across a number of uses, including collaboration over the content of individual files, management of Contract Deliverable Requirement List (CDRL) items, read-ahead management and interactive file manipulation. The repository system contains a built in indexing and file description capability. It also supports a variable menu structure that flexes based on the nature of the file type presented. This capability may be used as a direct source for mail attachments. All individual users are given an automatic personal file repository. A special case repository system will soon permit version control through check-in and checkout procedures for controlled files.

A powerful TECWEB component involves the ability to create and administer interactive WWW threaded discussion areas. In these areas, analogous to a French Café, many "tables" may have ongoing dialogs. Dialogs may be created and others may append and edit their comments to these dialogs. They may also create new threaded dialogs. The designated administrator may create and delete tables, as well as move dialogs among available tables. All TIDWEB and FACITT beta testing activities were effectively managed using this highly interactive exchange medium. In instances where preformatted input is desirable, automated WWW based forms permit both uploading and electronic mail forwarding of the relevant data. This capability permits an effective action tracking tool with appropriate follow-up and archiving capabilities.

When appropriate, a Threaded Discussion administrator may also call for a vote on any given discussion item on a Café "table". The vote may be a simple yes or no, or a ranking against a scale of desired range. This vote may be "canned" or custom formatted depending on configuration items selected. The ultimate extension of this voting capability is a stand-alone voting tool that currently Supports the Test and Evaluation Reliance Investment Board (TERIB) in its national balloting of issues. TIDWEB relies on this modular capability.

TECWEB can integrate a number of databases into its Web application environment. The range of such assets begins with simple Mini-SQL based tools adapted for flexible reconfiguration. These databases support directory functions for Range Commander's Council (RCC) and various user managed event calendars. TECWEB also accommodates Commercial Off The Shelf (COTS) stand-alone database applications running in their native web based development environments (e,g. File Maker Pro). TIDWEB relies on this modular capability. On the high end, ThCWEB supports full industrial strength Relational Database Management Systems (RDBMS). TECNET has invested in the NeXT Web Object COTS middle-ware capability to provide straightforward Web based interactive linkages to existing RDBMS assets anywhere on the WWW.

TECWEB possess a natural-language based COTS search engine which has the capability of crawling identified remote WWW sites as well as internally held information assets. Based on simple English language requests from users, this tool returns relevance ranked search results.

Advanced search refinement tools exist to allow the sophisticated user to create sophisticated contextually based searches. FACITT relies on this modular capability. This search engine can crawl designated web sites anywhere on the WWW or index any designated directories internal to TECWEB.

TECWEB is perfecting a high performance proxy capability to permit direct links to remote hosts without any appearance to the user that the capability lives anywhere other than TECWEB. This unobtrusive proxy capability offers added security at the remote end. Both TIDWEB and FACITT rely on this modular capability. This powerful proxy engine permits NT Operating system driven devices to operate from within the TECWEB environment. This proxy allows a single login with access to multiple NTs under the same protected session.

The TECWEB modules described above can either standalone or can be combined into larger applications. The overarching TIDWEB access control mechanism permits the effective integration of these modules under a role-based allocation. In essence, individual users or defined groups of users are linked to TECWEB resources. TECWEB resources, such as the above modules, may be further controlled for specific privileges, In this fashion, designated users may be granted administrative capabilities not available to other users. Moreover, access may be opened up or closed based on the phase of any given process. This access manipulation is purely web-based and quite straightforward to manage. It underlies the entire TECWEB system and has already proven its flexibility and ease of use in greatly reduced administrative overhead. The attached figure provides an overview of the TECWEB design and implementation philosophy. This web based capability lies at the heart of the TECWEB software design. It permits integration of all TECWEB modules and has proven a useful tool for linking COTS software as required.

TECWEB operates under Secure Socket Layer (SSL) encryption. SSL can be made mandatory for any application, as security may require. Other sophisticated security tools guard against inadvertent or intentional session bookmark activity. TECWEB session are unlimited in the presence of activity, but are timed out for inactivity. Use is automatically monitored for untoward Internet activity. TECWEB has been configured to be fully compliant with all Firewall access requirements. It is available from behind any standards-compliant DoD firewall, as well as one of its own. TECWEB permits extensive security auditing and configuration management options. At the same time, a standing TECWEB policy is to honor the sanctity of user information. This practice is time honored. The TECNET security practices are well documented and represent a rigorous policy and procedural guideline for he integrated TECET system. This document is attached. It highlights how the TECNET design is integrated with operating procedures to make this system a dynamic systems engineering reality.

During its history, the TECNET program flirted with the notion of providing database support to its customers. With BoOD support, TECNET and its service partners, including the RCC, expended a great deal of effort to catalog test facilities and capabilities by means of some sort of all-inclusive T&E facilities database. In 1994 and 1995, independent DoD CIM program funding finally permitted the development of the long anticipated Joint Test Assets Database (JTAD). JTAD, as a traditional database, fell short of success. JTAD was a highly complex database with a good front end and even a web-enabled interface. Because of its front end, however, the JTAD back end design could not be optimized for effective data collection. Its demands on field personnel were far too great to permit reasonable life cycle support.

TECNET became deeply engaged in supporting the Test Investment Web (TIDWEB) database in 1997 through 1999. This database was designed to most economically support the T&E Investment process and retain existing database expertise. Avoiding a total database redesign, development and re-deployment at an insupportable expense in 1998, TIDWEB adapted a hybrid web based approach using an existing File Maker Pro database. The roots of this investment database trace back to 1991. TIDWEB, phase I, was initially fielded in early 1999 in keeping with focused 1998 R&D funding. TIDWEB Phase II development, funded in 1999, is currently undergoing formal beta testing. The first lesson learned goes back to the basics of TECNET's long history. Successful product design and testing processes are synonymous and must directly engage actual end users if the product is to evolve naturally. Otherwise, it will never truly support real field users. The current TIDWEB beta test process, to the extent that Reliance players choose to participate, strongly reinforces this not-so-new observation. Significantly, through this documented testing process, the TIDWEB experience reveals some added lessons learned about the functional and economic pitfalls of the small-scale data based approach itself.

Database architectures grew out of 1970's theoretical research in computer science. This technology represents a mathematically sound means by which raw data may be efficiently stored and managed within a computer. Over the years, the database industry grew into a thriving multibillion-dollar technology market base, which now extends fully to embrace multimedia data. Today, databases represent a significant capability to manage large-scale data related problems, but the cost is prohibitive short of large-scale corporate commitments. Shared databases excel in areas where transactions come in large volume and the processes they support are generally stable. The billing center of any major credit card firm or the Defense Financial and Accounting Service (DFAS) provide good examples where scale and relative process stability warrants the appropriate investment in database technology.

JTAD and TIDWEB, on the other hand, represent areas where further database investment is inappropriate and unwarranted. Neither application has sufficient transaction volume to warrant the long term cost of maintaining high demand and thus, highly paid, database specialists. These specialists, initially compensated for what they know about databases, must also be trained extensively in database content before they can become useful resources for any given database. Thus, in a high turnover market, the expense of retaining such personnel can be additive.

Moreover, recent and ongoing T&E organizational changes introduce instability in the still evolving T&E investment process. This unavoidable instability further works against the database as an economical technology choice when viewed from a life cycle perspective. Database technology tends to be exacting and does not easily adapt to changes in the underlying processes. These processes, however, must exist to sustain the database design in the first place. This irony underscores why many well-intentioned databases designed for limited management information application have met with failure in the long run. This is also a potentially large risk in perpetrating TIDWEB as a hybrid database. There are other, more significant reasons.

In the 1980's, the Microsoft Corporation ushered in a new era in computing. The shift from central data processing, for which database technology was initially designed, to distributed processing at the desktop brought profound changes to the work place. This transformation introduced straightforward information management tools to the individual. Individuals can now easily create and transmit their own documents, spreadsheets, presentations and even personal databases (Should they possess the requisite knowledge and desire to do so). The need has all but disappeared for workers to rely on some distant and faceless corporate mainframe computer for such daily work activities. In essence, valuable corporate information (not data) can be generated, manipulated, stored, coordinated and shared on a far more personal level. Today's electronic mail traffic, replete with many binary attachments, testifies to the totality of this fundamental shift in work patterns.

This phenomenon implies that applications that demand remote entry will no longer meet with end-user satisfaction. In the T&E community, it is highly dubious that serious investment proposal submitters will want to enter thoughtful documents via a canned database interface, especially if presented via the WWW. Rather, the successful submitters would naturally prefer to use a familiar office appliance to create and coordinate documents of such organizational and personal importance. This concept contradicts existing TIDWEB design and operational constructs.

Finally, in the 1990's, the WWW itself is fostering yet another key shift in the way people think and work. The Internet started as a vast storehouse of all manner of unfiltered information that must be "pulled" down via a browser. The Internet is beginning to show its utility for interactive information sharing. This potentially cost- effective capability is just coming to practical fruition. As suggested above, this next revolutionary development is just now moving beyond the early adapters. The coming shift deals with the management of nothing less than knowledge as a corporate commodity. It is as profound, if not more so than he cultural shift to electronic mail.

Information when conveyed as abstract binary files and shared against a common contextual backdrop, can become knowledge if appropriately presented. This does not at all mean that the Internet need be converted into a mindless tool to collect a lot of fielded data inputs for others to use. As noted above, such application of the Internet, which is unfortunately touted at some organizational levels at some T&E field activities, is contrary to established work patterns. Such practice will most likely meet with disapproval. Rather, the Internet promises an ability to manage the necessary "binning" and manipulation of all forms of data files and content without a database. Such processes position information for consumption by designated individuals at some stage of a larger process. More importantly, however, the Internet can be harnessed to present filtered information in ways that reinforce contextual understanding of its participating beholder. This is an operant definition of knowledge. Such contextually relevant shared data cannot be delivered via a pure database such as TIDWEB.

The use of powerful search engines to sift through mountains of binary files to yield relevance ranked results is generally accepted on the WWW. When such search tools support natural language-queries and are focused on information that has been pre-screened through an established process, knowledge results. In this context, decisions are based on contextually relevant information as opposed to arbitrarily fielded data without any way to get at valuable, but hidden, contextual links. The critical evaluation process becomes far richer in such an environment. Unlike a database, which is explicit in responding to exacting queries, the emergent search technology reinforces implicit information related to semantic queries. This reinforces the T&E Investment process by revealing contextually relevant information. TECNET is already deeply engaged in pioneering such WWW based capabilities for the T&E community.

In 1998, TECNET fielded a rudimentary web based capability called the Facilities And Capabilities Information for Test and Training (FACITT) Phase I on TECWEB. In 1999, in keeping with 1999 R&D funding and published FACITT project plans, TECNET released FACITT Phase II on TECWEB. FACITT corrected the above noted shortfalls of JTAD.

As it currently operates, FACITT draws on the TECNET public home page based "Catalog of Test, Training and Laboratory Capabilities". This Catalog is located at http://tecnet0jcte.jcs.mil. This growing catalog points to thousands of publicly available web sites dealing with both Developmental and Operational T&E, DoD Training, Science and Technology (S&T) and Modeling and Simulation (M&S). It is categorized as above and cross-referenced by service or supporting activity/agency. Not only does the Catalog aim at main installation "Home Pages", but it also includes the detailed facility pages found deeper in a target installation's web site. Using a sophisticated "Web Spider", FACITT periodically scans these publicly available pages and all their related links. By going onto some depth, the catalog captures all valuable subject matter related WWW links on any given specific facility or capability. FACITT Web Spider "crawls" yield some 300K pages in return for the few thousand public pages scanned. These pages also include the Test Capability Master Plans (TCMP) and the annual Test Resource Master Plan (TEMP) that reside well out of public view in TECWEB. FACITT indexes the content of all these pages for subsequent retrieval via a powerful natural language search engine. For temporary Operations Security (OPSEC) reasons FACITT currently resides on the password protected TECWEB. It represents a powerful way to harvest focused information that is already available via the WWW Using FACITT, the former JTAD data collection cost is now negligible while the data yield is far more extensive than JTAD could ever become.

FACITT Phase II now offers a site registration process. This process allows sites that meet a minimal set of standards to get preferential search treatment. The minimal standards include an ability to identify facilities pages from the installation's home page and citations to valid point of contact information within individual facility pages.

FACITT also incorporates a set of key words derived from the 1996 T&E CIM funded Required Test and Evaluation Capability Analysis (RTECA). These keyword picks serve to assist a potential facilities researcher in formulating a meaningful query.

RTECA is worthy of special attention. As will be revealed, TECWEB has explored this capability in a new venue for a specific T&E field activity. The final 1997 RTECA product added great potential depth to the T&E Investment process. The product included two pieces. A Research Web tool offered timely insights into the DoD vision as it existed in 1996 and 1997. These visionary tools offered a way to shape and justify potential T&E investments against established national priorities. This quasi-web based, stand-alone offering used an early Personal Computer (PC) based search tool to isolate DoD and service visionary topics. Using a FACITT-like capability against the exiting DoD Doctrine section of the TECNET public home page, this type of information resource is straightforward to duplicate and expand using the most current DoD and service visionary and budget documents. As with FACITT, close hold documents can be obtained and domiciled within TECWEB, out of public view. The second aspect of RTECA is a database that lists necessary test investment areas. This national level capability can also be adapted to operate on TECWEB as may be required by the T&E investment process. A RTECA-like capability is already being built under separate TECNET R&D funding from the Air Force Flight Test Center (AFFTC).

Initiated in 1999, this independent TECWEB development for AFFTC is nearing completion. The notion of investment support at a field activity is similar to, but not identical to, the national T&E investment procedures. Both use an iterative process that transforms needs and solutions into a prioritized investment project slate. While the national structure focuses on justifiable, large-scale, joint-service investments via CTEIP, the AFFTC approach is to consolidate all available investment resources towards solution of a given technical problem. These resources include internal Improvement and Modernization (I&M) funds, CTEIP, Cooperative Research and Development Agreements (CRADA), Small Business Innovation Research (SBIR) and a number of other applicable grants and programs. Any AFFTC funded investment project is liable to include one or more of these investment vehicles.

The AFFTC investment process begins by framing technical shortfalls, or "needs", by existing basic and applied research initiatives. It also justifies these needs via existing high level vision. Correspondingly, TECWEB currently supports a dedicated AFFTC FACITT-Like capability that focuses on Air Force, Government, academic and industry research initiatives. A problem solver can search such terms as "hypersonic" and get a relevance ranked listing of research institutions that are engaged in some aspect of hypersonic work. Additionally such a search can be aimed at TECWEB housed AFFTC and other technology scans of a more proprietary nature. Likewise, another AFFTC search category looks at Air Force vision documents. This way, hypersonic investments may be accurately framed against existing USAF and DoD vision and budget projections. Another search area reveals current guidance pertaining to investment procedures. Yet another related area focuses on FACITT, Air Force facilities and existing AFFTC initiatives to assure that the potential new investment is not duplicative of established work or capabilities. Armed with such information, a technology need submitter is in a position to intelligently frame a meaningful, well-researched need. This emergent capability has met with strong support from AFFTC engineers.

The above description relates to a knowledge based Technology Planning Assistant developed specifically for AFFTC. This tool, however, represents a small part of the work being done on behalf of this large T&E field activity. A detailed process model of how AFFTC conducts investment planning directly drove the design of the Technology Planning Assistant. This Internal Definition-3 (IDEF-3) based formal process model is web enabled. Moreover, the model describes and permits direct definition of and web supported access to a number of powerful TECWEB applications. The Technology Planning Assistant represents one such application.

This TECWEB unique capability puts some real advantages in he hands of designated role players in any given process. As the IDEF-3 model forces a standardized, well-documented and organized AFFTC investment model, the tasks of all role players are explicitly defined. This COTS PC based model translates directly to a TECWEB based "electronic deskbook". The deskbook permits process newcomers to immediately "get up to speed" on newly assigned tasks. It further places any single task in the context of the overall process. Dynamic feedback tools linked directly to "process owners" at the PC level allows for requests for amplification, suggestions for process improvement or correction of logical inconsistencies that may arise. Most importantly, TECWEB's 1997 developed common administration tools permit allocation of system privilege to variously designated role players. This means that when inevitable process changes occur, the new process model may be rapidly re-compiled and the entire process quickly reconfigured on line. The off-line nature of the master process model makes configuration management more straightforward.

While the web enabled IDEF-3 process model automatically gives role players direct web based access to the information they need, the deskbook by itself would, no doubt, "get old" over time. Correspondingly, knowledge oriented applications such as the Technology Planning Assistant are separately and directly available for the journeyman participant. Thus, the model driven deskbook gives role players direct access to the information they need to get and to give in order to play their respective roles. The model permits a "hand-holding" way to navigate the process, or powerful model related knowledge pages to fulfill larger scale execution steps. They are interchangeable via internal TECWEB links.

Existing TECWEB information management modules, described previously, are already powerful. Combined with the process dynamics embodied in the IDEF-3 web enabled models, these existing TECWEB features permit appropriate "binning" and manipulation of data by approved individuals or groups of individuals.

Moreover, the industry leading natural language search engine resident on TECWEB overcomes many of the disadvantages formerly cited over the current TIDWEB approach. The search engine indexes some 259 popular binary file types, including all Microsoft Office file formats and the Adobe Portable Data Format (.pdf) file format. Thus, most binary files may be searched in their native mode, requiring no conversion or added handling. Search results are presented in such fashion that any file in the results page may be accessed in native mode or as specialized text documents with direct links to places where the user specified search term appears. A forthcoming release of the search engine will present these results such as they appear in the original document. The search engine may also be harnessed for fielded searches or even Structured Query Language (SQL) searches against existing SQL oriented databases. As previously noted, the search engine's "web spider" may be pointed to sources internal or external to TECWEB. The external search capability extends to protected remote web pages with appropriately negotiated access privileges.

Given the above capabilities, the deficiencies noted in the preceding treatment of TIDWEB can be overcome. Using the existing TECWEB integrated capabilities, data may be "binned" according to a defined process without need of costly database maintenance efforts. The process modeling capability and its rapid reconfiguration permits change to be documented and reimplemented naturally and rapidly (within days). The ability to support multiple binary file formats means that submitters may work with familiar office metaphors in preparing and submitting their required documentation. Where fielded searches are indicated, the worst case would be a requirement to use pre-formatted and downloadable Word, PowerPoint or Excel documents. In any case, these documents would be prepared off-line and uploaded at the discretion and schedule of the submitter. Thus the user need not be totally tethered to the Web for data input.

Importantly, the analytical skills are centered on building the process model and not the tools necessary to support the ThCWEB based applications. While the search engine required a two-year learning curve to master for FACITT, the knowledge is now acquired and will continue to be shared among the TECNET staff. More importantly, this knowledge does not depend on the content of that which is to be searched. Thus, the skills acquired are directly applicable to reuse for other applications. This resolves the dichotomy of technical and content oriented skills necessary to maintain even a small-scale database. As a result, the overall O&M cost is significantly lower using the search engine technology. Finally, the payoff is far greater, as the search engine yields the same type of capability of the database, but offers the added advantage of providing contextually relevant results as opposed to explicit answers where they are often not really applicable.

Recent experience has revealed that the AFFTC investment community is not the only benefactor of the TECWEB developed Process Based Knowledge System (PBKS) approach described above. Under direct assignment and research funding from the Army's Virtual Proving Ground (VPG) program, a similar capability is being developed to support the Army's electronic Test Operating Procedures (TOP) and international Test Operating Procedures (ITOP) for integration-into VPG test processes. As an interim approach, TECWEB also now hosts a dynamic knowledge portal for VPG, which employs the TECWEB search engine against established repositories and discussion areas for designated technology focus groups. The term "knowledge portal" has become an accepted WWW community term for such capability. Similar stand-alone knowledge portal capabilities have been harnessed for the East Coast Communications Network (ECCN) CTEIP program and the Global Positioning System (GPS) Central Display Navigation Unit (CDNU) program office. The CDNU capability is being readied for dynamic software deficiency reporting and testing. With the advent of FACITT Phase II, other TECWEB based programs have requested similar capabilities. In addition to supporting AFFTC in the area of capital investment processes, TECWEB's PBKS has also been extended to a detailed pictorially oriented web enabled interactive model of the AFFTC Phase I SBIR process. Another 1999 initiative involved initial IDEF-3 modeling of the CTEIP Joint Investment Management (JIM) process such that the CTEIP Automated Presentation Enabler (CAPE) may be considered for eventual PBKS treatment. The key point is that the PKBS concept appears to be readily adaptable to any web oriented information rich process. This approach also seems to be meeting with acceptance among those who have already harnessed the knowledge-based component of the PBKS capability. The process based component remains unevaluated at this time, but already adds value in helping to rigorously define and refine the knowledge based applications.

In taking this new direction, TECNET has taken a measured leadership role in the growing world of interactive and knowledge based WWW tools. To date, TECNET has done so on a very limited R&D and O&M budget, as compared to other corporate initiatives of similar scope and focus. This has been the proven case for the past fifteen years. With the notable exception of a Multi-Level Secure (MLS) TECNET initiative in 1994 and 1995 which was quickly overcome by WWW technology, the return on the TECNET investment dollar has generally proven to be high in the years following the development effort. Even the MLS effort paid off in a far more secure and ongoing TECNET posture in this age of applied information warfare.

In 2000, security remains "Job One" at TECNET. The primary developmental initiative involves installation, testing and cutover to a dedicated TECNET firewall. TECNET believes that firewall technology represents an essential, but the not do-all, end-all capability many assume it to be. Any firewall is useless without two other key provisions. One such provision is encryption. In 1999, TECWEB became fully encrypted using Secure Socket Layer (SSL) technology. The other provision, as backed by the enlightened security community is a solid host security program. TECNET has bi-annual off-site meetings to discuss security policy and reinforce day-to-day practice. Despite conventional beliefs of some, TECNET believes the United States is currently engaged in the opening volleys of Information warfare perpetrated by any number of unseen assailants. Unceasing local vigilance is the true key to sound security. TECNET learns this lesson frequently, as all incidents are investigated and reported as applicable.

In a recent security off-site, the TECNET team outlined why the existing corporate firewall cannot support TECNET's unique and diverse needs. Vital internal logging essential to good host level security is lost to a corporate firewall. More importantly, the corporate firewall is lax in some areas based the legitimate operational needs of others and too strict in areas where TECNET has established a genuine need. One such area is in the arena of Videoteleconferencing (VTC). The TECWEB 1998 VTC research need has been fulfilled, but cannot be brought to bear by the corporate firewall at his time. Finally, TECNET finds itself in the position of having to shift web Internet Protocol (IP) services based on immediate and emergent customer needs. Current firewall approval procedures are often insensitive to such needs. More importantly, TECNET security policies and practices are far more stringent than the corporate firewall will support.

Preparatory to this vital developmental thrust, TECNET acquired a suitable router in 1999. TECNET is also in the process of rigorously documenting its security policies and the practices derived from these policies. The practices already exist in written form and only await formal documentation and justification. Without such rigorous documentation, the derivation of a solid set of firewall rules is impossible. In 2000, such rules have become essential for TECNET to support its existing customer base with a diverse, but well-defined set of capabilities. All that remains is the acquisition and establishment of an IP blind firewall software package to run on an existing TECNET host computer. This computer shall become available when active Year-2000 certification is complete in November 1999. The estimated cost of this effort is $100K.

A second development initiative for 2000 involves the TECWEB and the TECNET home page "look and feel". The existing TECNET web based user interfaces are two years old. They were adequate two years ago when the content level was relatively low but had outgrown the initial 1996 web interface. As content has grown rapidly, the existing interfaces have become increasingly outmoded and navigation has become labored. Spring boarding on an initiative already underway to give the TECNET home page a facelift, the 2000 effort will extend to include a similar TECWEB look and feel. The relatively high cost of this effort is because the design considerations begin with security, move to technical performance and navigability issues, and then consider ongoing maintainability and expansion capacity. Then and only then, are the aesthetic aspects of the problem brought into play. The design of an effective web interface is more of an engineering problem than an artistic one.

Rather than spasmodically converting TIDWEB or CAPE wholesale to a PBKS approach, the practical alternative is to adapt valid user feedback to build new user component capabilities as indicated using the appropriate tools to do so. In turn, such capabilities must be refined, adapted and hopefully generalized through aggressive user testing. This way, development is evolutionary as opposed to revolutionary. Likewise, development is geared to genuine user requirements as opposed to a set of assumed, but untried, capabilities.

By having the PBKS tools in the TIDWEB and CAPE toolbox, new user requirements can more handily be fulfilled as they emerge. Based on existing user feedback readily available in the TIDWEB bug and suggestion forums, the PBKS tool-set will prove most useful in satisfying true user requirements. While most bug reports deal with a fleeting issue, the larger concerns deal with the dynamics of the underlying investment process. This is the area most suitable to a case-by-case PBKS approach. As a case in point, there has been much criticism of the treatment of old T&E needs and solutions in TIDWEB. This TIDWEB subsystem, currently perceived by some as dysfunctional under File Maker Pro, is a fertile proving ground for PBKS based principals.

TECNET brought the existing AFFTC and VPG PKBS work to fruition by the end of calendar 1999. At the same time, TECNET plans to begin charting the migration to TIDWEB and CAPE to a PBKS environment. As described above, this process will be deliberately calibrated to substantiated user feedback. At the same time, there is a need to reassess some key existing TIDWEB capabilities.

At the July 1999 TIDWEB Phase HI beta test kickoff meeting, there was much discussion and concern about the mechanics of Reliance Panel deliberations. The existing TIDWEB specification for this process called for different time, different place deliberations involving voting on needs and solutions in serial fashion. The feedback from the Reliance Panel participants at this meeting indicted that the need and solution evaluation process was holistic in nature and frequently necessitated face-to-face meetings. Given this, support of the collaborative nature of the Reliance Panel deliberation process needs to be totally re-engineered based on the practical realities. Fortunately, the combined participants in this meeting provided substantive materials that helped define more precisely how Reliance business was really conducted. TECNET is in possession of these materials and is initiating a 2000 project to update the collaborative interface to fulfill these expectations.

As the T&E Investment process evolves and the TECNET development team and the end users develop a mutual trust relationship, aspects of the AFFTC Technical Planning Assistant may be applicable to the process dialog. The TECNET plan in 2000 is to explore some aspects of the process front end with the affected individuals. The key pre-requisite in this process involves moving ahead only with the active support of the affected users. Based on past TECNET experience, this is entirely possible and absolutely necessary.

Finally, TECNET has a number of ongoing bread and butter developmental issues. A number of users have requested changes to the TECWEB electronic mail system to make this capability more robust to augment their specific applications. Integration of an active user directory is foremost on this list of requirements. Users have also identified key enhancements to the TECWEB file repository system. A capability to manage document version control tops this list. This feature also plays a large role in future plans for the TECWEB based PBKS capability. The TECWEB proxy supports databases that reside on Microsoft NT based machines. For valid security reasons, TECNET does not support NTs directly on the Internet. Rather, NTs are "firewalled" on a backnet and accessed via a proxy capability. 1999 CAPE development revealed a-legitimate need for this proxy to handle JAVA code. Likewise, it is useful to build encryption into this robust proxy capability such that it may be made interoperable with networked NT machines outside of the TECNET realm. TECNET support to the Range Commander's Council (RCC) involves the RADar CALibration (RADCAL) satellite capability. With the launch of a new RADCAL bird in late 1999, new RADCAL scheduling capabilities are being developed on TECWEB. Likewise TECWEB supports the Universal Documentation system (UDS) for the RCC. New UDS training requirements call for added development in the TECNET environment involving the newly acquired WEB CT distance-learning tool. TECNET has committed to the Foundation Initiative 2010 to build an online Excel Spreadsheet manipulation capability over the encrypted TECWEB. The alternatives have been identified and prototyped. Development of this desired on-line capability is now required. New requirements have also been levied against the TERIB voter.

It is important to note, since FY2000 is already underway, that the TECNET contract with Clemson University has been renewed and a promissory commitment is in place for the required FY2000 Clemson support. Correspondingly, Clemson University has staffed accordingly and is already executing on assigned tasks.

Given the above description, TECWEB fulfils the role of a Business to Business Application Service Provider (ASP). The following specific objectives can be met at truly minimal developmental expense.

(a) Key documents and data in TECWEB may be managed in a collaborative way.

(b) TECWEB can integrate automatic E-mail notifications based upon stated business rules and schedules.

(c) Data and documents on TECWEB may correlate within the project or functional area, such as test program forecasts, test capability requirements.

(d) Through growing use and adaptation, TECWEB has proven to be "user-friendly" (easily understood and navigable) which serves to promote its general acceptance and usability.

(e) Based on the WWW, TECWEB be distributed to end users throughout the United States (or the World) without requiring the addition of any new client software on the networked computers.

(f) TECWEB is completely maintainable with appropriate controls to protect sensitive enterprise data on a central system. TECWEB can also support unclassified information cleared for unlimited distribution on a public WWW medium.

(g) TECWEB may be configured as a stand-alone capability to support protection for appropriately networked Secret, Top Secret, and SAR information.

(h) TECWEB can support both keyword and full text search capability.

(i) TECWEB has adequate capacity to handle projected usage and data storage, and can be easily upgraded as demand for the service increases.

(j) TECWEB performs daily incremental backups under automated controls. Full backups are performed in early AM hours twice weekly.

(k) TECWEB is operational 24 hours/day 7 days/week (except for scheduled maintenance).

(l) As most all required capabilities already exist, startup and maintenance costs are reasonable (low) and focus exclusively on corporate data organization requirements vice new capabilities.

In addition to meeting the above stated objectives, use of TECWEB offers added benefits.

(a) TECWEB's modular design can assure flexible response to emergent information or process needs and supports enforced access controls to existing data. Ongoing TECNET R&D at the University level will extend to address future web capabilities.

(b) TECWEB requires nothing but a network connection, a password and a web-browser on the user's workstation. It is DoD firewall compliant. The TECWEB user interface is designed against known WWW efficiency principles to assure ease of use. TECWEB is Year2000 Compliant as established by exhaustive date testing.

(c) TECWEB exists and has a long history of successful development and utilization. As development costs are sunk, there is little or no requirement for systems development to meet AFFTC needs other than data organization. The initial focus will be on AFFTC data needs as defined in more detailed AFFTC LRTPSS design documents.

The TECNET Home Page is located at http://tecnet0.jcte.jcs.mil

TECWEB is located at http://tecnet1.jcte.jcs.mil An account is required to gain access to TECWEB.

Figure 7:
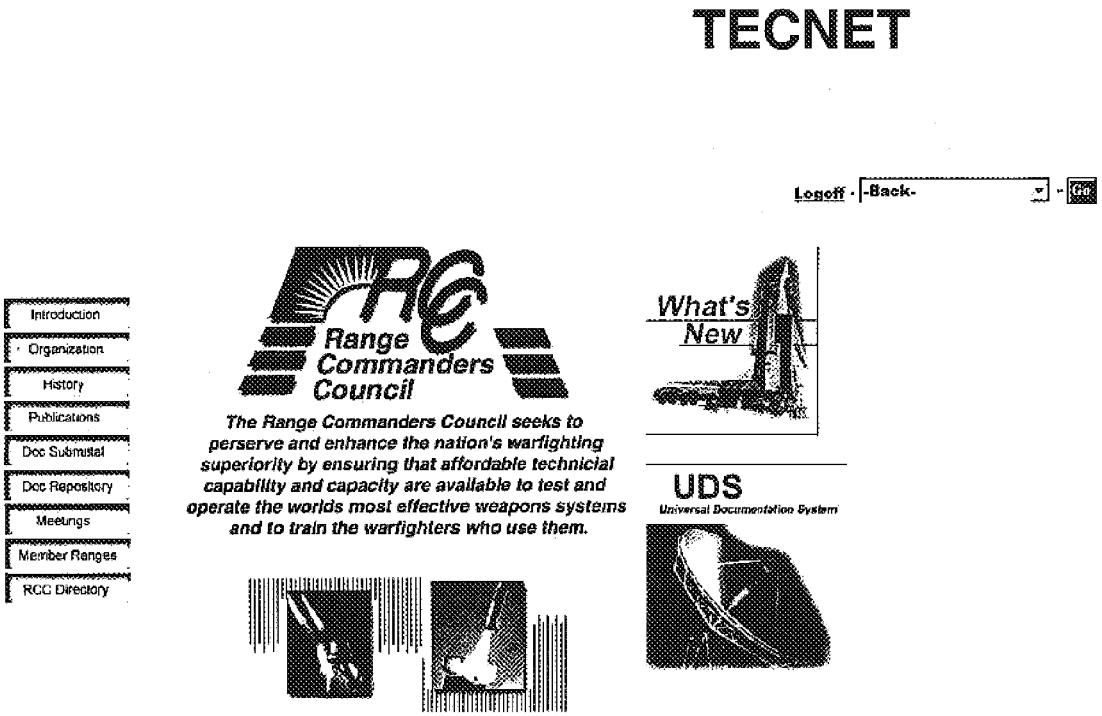
FIG. 7 is the screen one sees after logging in on TECNET.

TECNET is managed on behalf of the entire T&E community by Mr. George F. Hurlburt. TECNET is physically located at the Naval Air Warfare Center—Aircraft Divison, Patuxent River, Md. Mr, Hurlburt may be reached via electronic mail at hurlburt@tecnet1.jcte.jcs.mil. Telephone: 301-342-3625; FAX 301-342-3134. Mr. Hurlburt, the TECNET Executive Secretariat, stands ready to discuss this report in greater depth as required and is prepared answer any questions that may arise as a result of this description. FIG. 7 is the TECNET screen one sees after logging in on the net.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A web-based method for sharing collaborative test and evaluation knowledge, said method comprising the steps of:

logging into an Internet connection processor which selectively shares common data resources with a user terminal which is provided selective access based upon a user's identity;

establishing a user's identity by an identity encryption session, wherein said establishing step is performed by having the user's identity established by having the user give a pre-arranged password associated with the user's identity;

sharing collaborative test and evaluation knowledge by providing the user terminal with a selective access to data resources that are authorized for the user's identity;

providing each user's terminal with a search engine capable of searching for matches of scanned images in libraries containing image recognition data bases and pattern matching libraries; and using a video conference server to provide multiple user terminals with video conferencing e-mail.

* * * * *